Nov. 20, 1945.  G. B. GALLASCH  2,389,252
OPTICAL INSTRUMENT
Filed Feb. 17, 1943
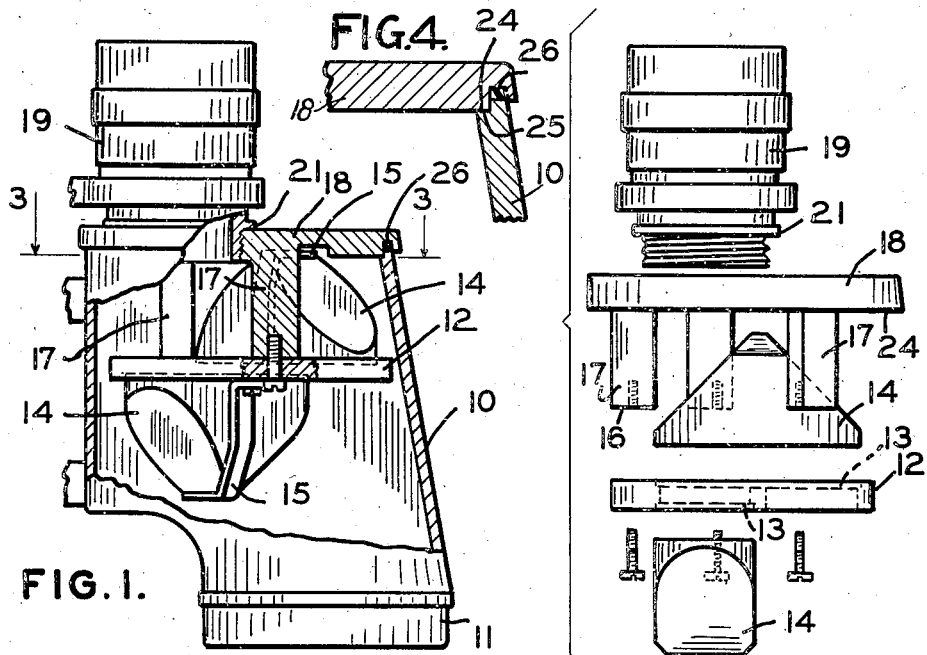
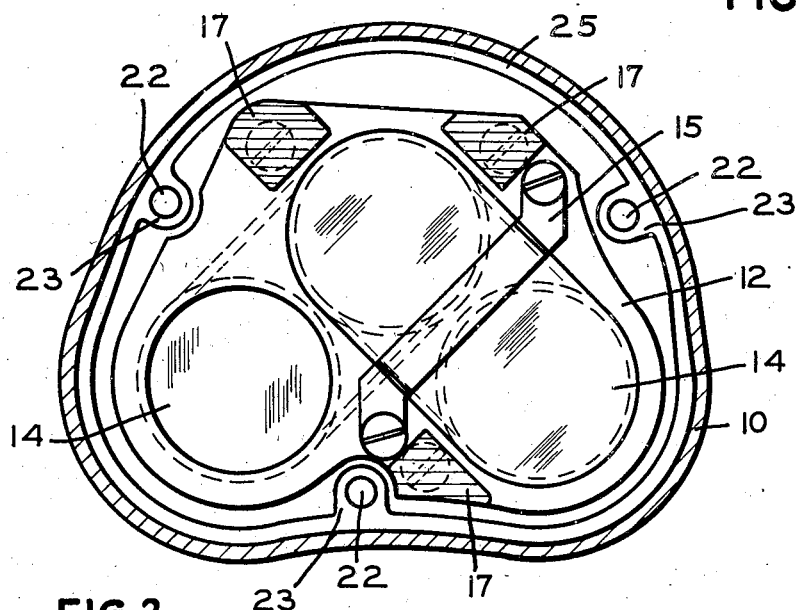
GEORGE B. GALLASCH
INVENTOR
ATTORNEYS Patented Nov. 20, 1945

2,389,252

UNITED STATES PATENT OFFICE 2,389,252

OPTICAL INSTRUMENT

George B. Gallasch, Rochester, N. Y., assignor to Bausch & Lomb Optical Company, Rochester, N. Y., a corporation of New York Application February 17, 1943, Serial No. 476,173

8 Claims. (Cl. 88—33)

The present invention relates to optical instruments and more particularly to prismatic telescopes and like instruments.

In the now generally accepted practice of assembling prismatic telescopes and similar instruments such as binoculars, the prisms are fixed in a predetermined position on a shelf which is subsequently mounted on interior seats or lugs generally formed integral with the body member of the instrument. To insure that the shelf will be held in the proper position relative to the optical path of the instrument, the engaging surfaces of the lugs or seats and the shelf are carefully ground uniplanar, the surfaces of the seats or lugs generally lying in a plane perpendicular to the optical axis of the objective of the instrument. After the prisms are properly mounted to the shelf, the latter is inserted into the body member and secured to the seats or lugs formed on the inner surface of the same.

A closing cap is secured to one end of the body member and the one end of a tubular mount, carrying an ocular system, is mounted to the body member through an aperture formed in the cap.

The opposite end of the body member is closed by the objective lens which is usually eccentrically mounted relative to the body member so that the optical axis thereof may be laterally adjusted to bring the same into alignment with the optical path defined by the other optical elements of the instrument.

It has been difficult to properly mount the prism shelf in the body member for the interior lugs which supported the shelf were more or less inaccessible and difficult to machine to the accuracy necessary. It was difficult to insure that the prisms were properly mounted on the shelf and to check for squareness of the prism assembly and optical alignment of the same without first securing the shelf in position within the body. This increased the time of assembly, made necessary the employ of skilled workmen, and consequently increased the manufacturing costs of quality instruments.

In the instrument of the present invention, the prisms are adjustably mounted on the usual shelf by any manner acceptable and the shelf is mounted to the cover or closing cap rather than the inaccessible lugs formed on the interior wall of the body member. Although the shelf can be mounted to the cap in any manner desired, in the preferred form of the present invention, the shelf is secured to a plurality of short pillars carried by the cap and which space the prism assembly the proper distance from the eyepiece or ocular system of the instrument. The ocular system is mounted in the usual mounting tube, one end of which may be secured in an aperture formed in the cap or, if desired, the tube can be formed integral with the cap.

Thus the eyepiece, cap and the shelf carrying the prisms form one complete assembly unit and the prism assembly can be squared and optically aligned with the eyepiece before the unit is mounted within the body member.

To insure that the prisms will be properly mounted within the body member when the cap is secured thereto, the body member is formed with an accurately machined uniplanar seat which is engaged by a complementary uniplanar surface formed on the cap when the latter is fixed to the body member. As the cap is formed of relatively rigid material and made somewhat heavier than the usual closing cap of prior instruments, the prisms will be properly held within the body once the cap is properly secured to the same.

As the ocular system and prism assembly of the instrument herein disclosed can be optically aligned before the same are mounted in the body member, the necessity of removing the prism assembly, as was often the case, to cure misalignment of the same and not remediable through adjustment of the objective mount, is eliminated. Furthermore, as the complementary surfaces of the cap and body member insure that the aligned ocular and prism systems will be properly mounted relative to the body member, the objective system can be easily brought into alignment if the same is found to be out of alignment when assembled with the body member by appropriate movement of the eccentrical mount.

Thus many of the assembly operations can be done by relatively unskilled operators, which reduces the cost of the assembly. The cost of assembly is further reduced for the time of assembly of the instrument of the present invention is considerably reduced. Not only is the assembly time reduced, but the time of repair operations on used instruments as well.

Other objects and advantages of the present invention will appear from the following description taken in connection with the accompanying drawing in which:

Fig. 1 is an elevational view partly in section of one unit of a prism binocular embodying the improvements of the present invention.

Fig. 2 is an exploded view of the eyepiece, closing cap, and the prism assembly.

Fig. 3 is a section, on an enlarged scale, taken along line 3—3 of Fig. 1.

Fig. 4 shows the detail of the cap and body joint.

The device of the present invention, for the purpose of illustration, has been shown as a prismatic binocular and for convenience of illustration only one unit of the instrument has been illustrated. The instrument comprises the usual body member 10 and it will be noted that the interior surface of the body member is formed substantially free of any projections or lugs such as heretofore have been used for mounting the prism shelf within the body. This, as will be obvious, permits the interior of the body to be more conveniently cleaned before the optical elements of the instrument are mounted therein.

The optical elements of the instrument include an objective assembly 11 mounted in one end of the body member 10 by means of an eccentric ring, such as disclosed in U. S. Patent No. 959,739, which permits the objective to be rotated to laterally adjust the optical axis thereof.

The prism carrying shelf 12 of the instrument of the present invention may take any form desired and as shown is provided on its opposite faces with recessed seats 13 in which are adjustably mounted the Porro prisms 14 by the means disclosed and claimed in U. S. Patent No. 2,306,853. The Porro prisms can be held on the shelf 12 after adjustment by any conventional means such as the straps 15.

In the assembly of the device of the present invention, after the prisms 14 have been secured in the proper position on the shelf 12, the latter is secured by conventional means such as the screws shown to the end faces 16 of a plurality of pillars 17 carried by a closing cap 18. In the broader aspects of the device of the present invention, the shelf 12 can be secured to the cap 18 by means other than the pillars disclosed or the pillars may be carried by the shelf 12 and the cap 18 attached thereto. It is now preferred, however, to form the pillars 17 integral with the cap 18 although it will be obvious that the pillars can be formed separately from the cap 18 and then subsequently secured thereto by any conventional means desired.

The ocular system of the instrument, although it has not been shown, is mounted within the mounting tube 19 which is threaded into an aperture formed in the cap 18 until a stop collar 21 is brought into tight engagement with the outer surface of the cap 18. If desired, the tube 19 can be formed integral with the cap 18 although in the preferred embodiment of the instrument, the tube is mounted as shown.

As the cap at this time has not been secured to the body 10, the thus assembled unit can be easily checked for squareness of the prism assembly and the optical axis of the ocular system can be aligned with that of the prism assembly without the difficulty heretofore encountered when the prism shelf was mounted on lugs formed on the interior surface of the body member 10 and the ocular tube fixed to the latter.

After this operation has been completed, the cap 18 is secured to the body member 10 through a plurality of screws, not shown, which are threaded into tapped apertures 22 formed in bosses 23, formed integral with the wall of the body member 10. To insure that the prism carrying shelf 12 will be properly mounted within the body member 10 when the cap is secured thereto, the portions of the surface of the shelf 12 engaged by the end faces 16 of the pillars 17 are formed coplanar and the latter are accurately ground parallel to a uniplanar surface 24 formed on the under surface of the cap 18. The surface 24 is adapted to engage a uniplanar seat 25 formed about the end of the body member 10 closed by the cap 18. Thus the shelf 12 will be held parallel to the seat 25, which forms a reference plane for all optical elements of the instrument, merely by mounting the shelf 12 to the pillars 17 of the cap 18 and securing the latter to the body member 10 by the screws which when threaded down bring the surface 24 of the cap 18 into engagement with the seat 25.

Thus it will be seen that the assembly operations after the prisms 14 are properly mounted on the shelf 12 relative to the ocular system can be performed by relatively unskilled operators to effect a reduction in the cost of assembly of the instrument.

The joint between the cap 18 and the body member 10 is sealed through a gasket 26, held in a suitably formed groove formed in the under surface of the cap 18, and compressed when the cap is clamped against the upper end of the body 10.

It will be seen that the present invention reduces considerably the assembly time of binoculars and like instruments and as the cost of the assembly operation constitutes a relatively large part of the manufacturing cost, an appreciable reduction in the selling price of the instrument is had.

Another advantage of the present invention is that as the ocular tube, cap, and prism assembly can be removed from the instrument as an integral whole, instruments made in accordance with the present invention can be repaired at a much smaller cost than the previous instruments in which the prism shelf was mounted to the interior lugs formed on the wall of the body 10.

While one embodiment of the invention has been disclosed, it is to be understood that the invention need not be limited to the device described, but is susceptible of modifications falling within the spirit of the invention and the scope of the appended claims.

I claim:

1. In an optical instrument of the type described, a body member; a cap for closing one end of said body member; an eyepiece carried by the cap; means for holding said cap in a predetermined position on said body member; a prism shelf; a plurality of prisms mounted on said shelf; a plurality of pillars carried solely by said cap and extending into said body member; means for mounting said shelf to said pillars, the end surfaces of said pillars cooperating with surfaces on said shelf to hold said shelf in a predetermined position within said body member whereby the prisms and eyepiece may be assembled as a unit and then positioned within the body member.

2. In an optical instrument of the type described, a body member; a cap for closing one end of said body member; means for holding said cap in a predetermined position on said body member; a prism shelf; a plurality of prisms; means for mounting said prisms to said shelf; a plurality of pillars integrally formed with said cap and extending into said body member when the cap is mounted thereon; and means for mounting said prism shelf to said pillars; the end faces of said pillars cooperating with surfaces on said shelf for holding said shelf in a predetermined position within said body member.

3. In an optical instrument of the type described, a body member; a seat formed at an open end of said body member, the surface of said seat being uniplanar and the plane of said surface being fixed relative to the predetermined axis of said body member; a cap for closing the open end of said body member; a uniplanar surface formed on said cap and adapted to engage said seat when the cap is mounted on said body member; a prism shelf; a plurality of prisms mounted on said shelf; a plurality of pillars integral with said cap and extending into said body member when said cap is mounted thereon; means for mounting said shelf to said pillars; and means carried by said pillars and cooperative with means carried by said shelf for holding said shelf in a predetermined position within said body member.

4. In an optical instrument of the type described, a body member; an ocular tube; a cap for closing one end of said body member; means for connecting said ocular tube to said cap; a seat formed at the end of said body member, the surface of said seat being uniplanar, the plane of said surface being fixed relative to a predetermined axis of said body member; a uniplanar surface formed on said cap and adapted to engage said seat when said cap is mounted on said body member to hold the axis of said ocular tube in a predetermined position relative to said body member; a prism shelf; a plurality of prisms; means for mounting said prisms to said shelf; a plurality of pillars integral with said cap and extending into said body member when said cap is mounted thereon; means for mounting said shelf to said pillars; and means carried by said pillars and cooperative with means carried by said shelf for holding the same in a predetermined position relative to the axis of said ocular tube.

5. In an optical instrument of the type described, a body member; an ocular tube; a cap for closing one end of said body member; means for connecting said ocular tube to said cap; a seat formed at the end of said body member, the surface of said seat being uniplanar, the plane of said surface being fixed relative to a predetermined axis of said body member; a uniplanar surface formed on said cap and adapted to engage said seat when said cap is mounted on said body member to hold the axis of said ocular tube in a predetermined position relative to said body member; a prism shelf; a plurality of prisms; means for mounting said prisms to said shelf; a plurality of pillars integral with said cap and extending into said body member when said cap is mounted thereon; means for mounting said shelf to said pillars; and means carried by said pillars and cooperative with means carried by said shelf for holding the same in a predetermined position relative to the axis of said ocular tube, said means comprising the end surfaces of said pillars, said end surfaces being uniplanar and parallel with the surface of said cap.

6. In an optical instrument of the type described, a body member; an ocular tube; a cap for closing one end of said body member; means for connecting said ocular tube to said cap; a seat formed at the end of said body member, the surface of said seat being uniplanar, the plane of said surface being fixed relative to a predetermined axis of said body member; a uniplanar surface formed on said cap and adapted to engage said seat when said cap is mounted on said body member to hold the axis of said ocular tube in a predetermined position relative to said body member; a prism shelf; a plurality of prisms; means for mounting said prisms to said shelf; a plurality of pillars integral with said cap and extending into said body member when said cap is mounted thereon, the end surfaces of said pillars being in a common plane parallel with the surface on said cap; and means for securing the shelf to said pillars with a predetermined face thereof in facewise engagement with said end surfaces, the engaged surfaces of said shelf being formed in a common plane whereby said shelf is mounted within said body member in predetermined position relative to said seat.

7. In an optical instrument of the type described, the combination of a cap for closing an end of the body of the instrument, an eyepiece carried directly by the cap, a prism shelf carrying a plurality of prisms, and means for supporting said shelf and prisms solely from said cap and in a predetermined relation to the eyepiece, said means comprising three spaced pillars each having an end secured directly to the cap, the other ends of the pillars determining a plane and being held in engagement with a plane surface on the shelf, said plane surface being located in a predetermined relation to the faces of the prisms whereby the prisms and eyepiece may be assembled and adjusted as a unit and then positioned in the body member.

8. In an optical instrument of the type described, the combination of a body member, a cap for closing one end of the member, surface means on the member cooperative with surface means on the cap for holding said cap on said member in a predetermined position, an eyepiece carried directly by said cap, a prism shelf carrying prisms within said body member, means for supporting the shelf solely from the cap with the prisms in a predetermined relation to said eyepiece, said last named means comprising three spaced pillars having their respective ends secured only to the cap and the shelf whereby the prisms and eyepiece may be assembled and adjusted as a unit and then inserted in the body member in a predetermined location relative to an objective carried at the other end of the body member.

GEORGE B. GALLASCH.